UNITED STATES PATENT OFFICE.

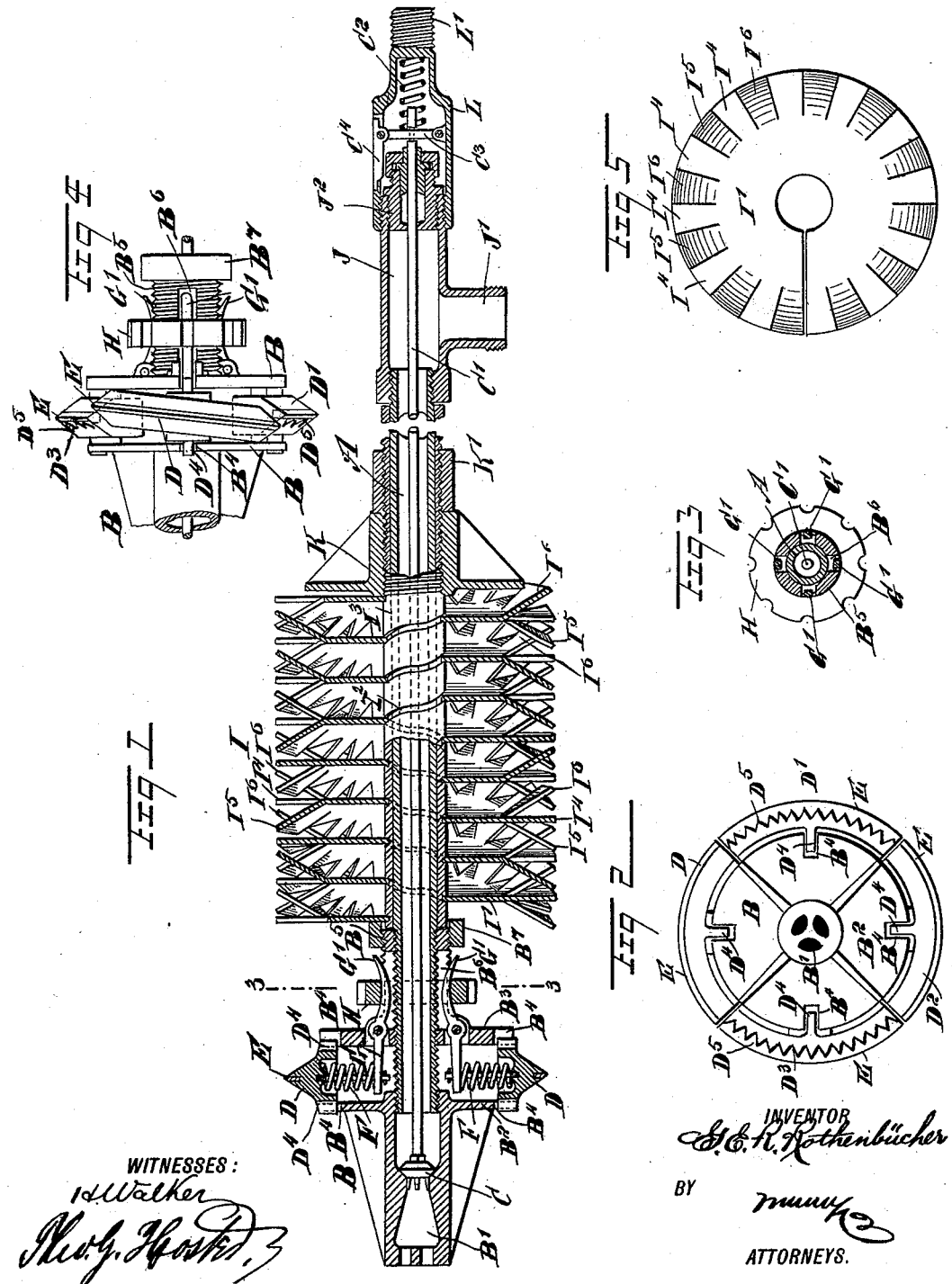

GEORGE E. R. ROTHENBÜCHER, OF BLOOMFIELD, NEW JERSEY.

FLUE-CLEANER.

SPECIFICATION forming part of Letters Patent No. 595,971, dated December 21, 1897.

Application filed November 18, 1896. Serial No. 612,640½. (No model.)

*To all whom it may concern:*

Be it known that I, GEORGE E. R. ROTHENBÜCHER, of Bloomfield, in the county of Essex and State of New Jersey, have invented a new and Improved Flue-Cleaner, of which the following is a full, clear, and exact description.

The object of the invention is to provide a new and improved flue-cleaner which is simple and durable in construction, very effective in operation, and arranged to thoroughly remove the scales from the flue.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a longitudinal section of the improvement. Fig. 2 is a front elevation of the same. Fig. 3 is a transverse section of the same on the line 3 3 of Fig. 1. Fig. 4 is a plan view of the scraper and adjacent parts, and Fig. 5 is an end elevation of one of the disks for the brush.

The improved flue-cleaner is provided with a pipe A, on the forward end of which is screwed or otherwise secured a head B, formed with a nozzle B' for the escape of steam or other fluid to remove the loosened scales from the flue or pipe, as hereinafter more fully described. In the head B is also arranged a valve-seat, normally closed by a valve C under the control of the operator, to permit steam to escape into the nozzle whenever desired. The head B is further provided near its rear end with a plate $B^2$, forming with a similar plate $B^3$, screwing on the pipe A, guideways for the jaws D D' $D^2$ $D^3$ of a scraper adapted to cut into the scales contained on the inside of the flue or pipe.

Each of the jaws D D' $D^2$ $D^3$ is formed with lugs $D^4$, extending into radial slots or notches $B^4$ in the plates $B^2$ and $B^3$, so that the jaws can move outwardly to bring their cutting edges E into engagement with the scales on the inside of the flue or pipe. The jaws are preferably beveled or V-shaped, with the cutting edge E, of steel or like material, set into the jaw, as plainly indicated in Fig. 1. Two of the jaws D and $D^2$ are preferably set at angles to the axis of the head, as is plainly indicated in Fig. 4, while the other jaws D' and $D^3$ are formed at their forward bevel with teeth $D^5$ for breaking into the scales after the cutters E have cut into the scales. Thus when the cleaner is revolved in the tube or flue the cutters E cut into the scales and the teeth $D^5$ break off the scales as the device moves inward in the flue, it being also understood that the jaws D and $D^2$, on account of setting at angles, cut spirally into the scales, so as to effectively loosen the same.

The jaws D D' $D^2$ $D^3$ are mounted yieldingly in the head B, and for this purpose the jaws rest with their inner faces on springs F, each of which is held at the inner end of a lever G, fulcrumed on the plate $B^3$. Each lever G is formed with an outwardly-curved end G', extending into a longitudinal recess $B^6$, formed in the hub $B^5$ for the plate $B^3$, and the several curved arms C' of the levers G are engaged by a nut H, screwing on the threaded hub $B^5$, so that the inner ends of the levers G are swung inward or outward to increase or diminish the tension of the springs F, supporting the jaws D D' $D^2$ $D^3$.

In the rear of the scraper, formed by the yieldingly-mounted jaws, is arranged a brush I, cylindrical in shape and formed of a series of metallic disks I', split radially, as indicated in Fig. 5, and bent into spiral form, as is plainly indicated in Fig. 1. Each disk is fitted with its inner edge upon a spiral groove $I^2$, formed on a pipe $I^3$, held on the pipe A between the end of the hub $B^5$ and the inlet J for the steam and secured on the rear end of the pipe A. The several disks I form a continuous spiral on the pipe $I^3$, and each disk is formed with bristles $I^4$ $I^5$ $I^6$, struck up from the middle of the disk and of which the bristles $I^4$ extend radially, while the bristles $I^5$ are bent forwardly, and the bristles $I^6$ are bent rearwardly such a distance that the bristles $I^5$ of one disk interlock with the bristles $I^6$ of the following disk. (See Fig. 1.)

As shown in Fig. 5, a radial bristle $I^4$ is followed by a bristle $I^5$, and then a bristle $I^4$ again follows this bristle $I^5$, and a bristle $I^6$ follows this bristle $I^4$, so that the bristles $I^5$ I⁶ bend in opposite directions from the radial bristle I⁴, which stands between them. The rearmost disk I' is engaged by a head K, screwing on the pipe A, and a jam-nut K' engages this head K, so as to securely lock the head and disks in place. The forward disk I' abuts against a collar B⁷, screwing on the rear end of the hub B⁵, as indicated in the drawings.

The inlet J, previously mentioned, is made in the form of a T, of which the branch J' is adapted to be coupled with a steam or other fluid supply, and the other branch contains a stuffing-box J², through which extends the stem C' for the valve C, above referred to.

The outer end of the stem C' is engaged by a lever C³, fulcrumed in a ferrule L, and this lever C³ is provided with a folding pivot-arm C⁴, normally folded in the ferrule L and adapted to be swung outward, so as to be taken hold of by the operator to move the valve-stem C' and the valve C rearwardly, to move the valve off its seat and permit the steam to pass from the inlet J through the pipe A to the nozzle B' and through the same into the flue. A spring C² presses against the lever C³, so as to hold the valve-seat normally to its seat. The end of the ferrule L is provided with a screw-thread for connection with a handle for permitting the operator to conveniently move the cleaner into and through the flue.

The operation is as follows: When the cleaner is inserted into the end of a flue, then the valve C is in a closed position and the branch J' is preferably closed by a cap. The operator by taking hold of the handle of the cleaner pushes the latter inward into the flue and at the same time turns it, so as to cause the cutters E of the jaws to cut into the scale on the inside of the flue. By turning the device the angularly-set jaws D D² cut and loosen the scales, and at the same time the teeth D⁵ break off the scales cut loose by the cutters E. The followings of the brush I remove the remaining particles of scales, so that the scales drop to the bottom of the flue and a great portion thereof is pushed out of the flue by the brush I. When the flue has thus been acted on, the operator pushes the cleaner to the outer end of the flue and connects the branch J' with a steam-supply and finally opens the valve C by throwing the lever C³ rearward to permit steam to pass through the pipe A and nozzle B' into the flue and force any remaining scales out of the same.

It will be seen that the device is very simple and durable in construction, can be readily manipulated, and in case of injury to any one of the disks of the brush the same can be readily removed and replaced by a new one at comparatively little expense.

Having thus fully described my invention, I claim as new and desire to secure by Letters Patent—

1. A flue-cleaner, provided with a scraper having segmental jaws, some of the said jaws being perpendicular to the scraper's axis, and spaced from each other to receive between them other jaws spaced from the adjacent perpendicular jaws and arranged obliquely at an angle to the scraper's axis, each of said oblique jaws being partly on one side of the plane of the perpendicular jaws and partly on the other side of such plane, substantially as described.

2. A flue-cleaner, having transversely-arranged cutters or jaws provided with bevels inclined forwardly and rearwardly of the flue-cleaner, some of the jaws being provided with teeth rigid therewith and located on that bevel which faces toward the front end of the flue-cleaner, substantially as described.

3. A flue cleaner or scraper having spaced jaws arranged in a plane perpendicular to the scraper's axis and provided with teeth on that side which faces the front end of the scraper, and oblique jaws arranged between said perpendicular jaws, substantially as described.

4. A flue-cleaner, provided with a scraper having a head, segmental jaws fitted to slide in the said head, springs supporting the said jaws individually, and levers each carrying one of the said springs, and adapted to be adjusted for increasing or decreasing the tension of the springs, substantially as shown and described.

5. A flue-cleaner, provided with a scraper, comprising a head, segmental jaws fitted to slide in the said head, springs supporting the said jaws, levers fulcrumed on the said head and carrying the said jaws, and a nut screwing on the hub of the said head and engaging the said levers, substantially as shown and described.

6. A flue-cleaner, provided with a brush comprising a rod having a spiral groove, a series of spiral disks fitted into the said groove, each disk being formed with bristles, some of which extend radially, the adjacent ones being bent in opposite directions, substantially as shown and described.

7. A flue-cleaner, provided with a central pipe, a head secured on the outer end of the said pipe and formed with a nozzle and a valve-seat, a valve adapted to engage the said seat and having its valve-rod extending through the said pipe, an inlet connected with the said pipe and formed with a stuffing-box for the said valve-rod, a spring for closing the valves and a lever engaging the outer end of the said rod for moving the valve off its seat, substantially as shown and described.

GEORGE E. R. ROTHENBÜCHER.

Witnesses:
EDWARD M. BUEHLER,
GEO. P. BUEHLER.